J. Myers.
Railroad Turn Table.
N° 189.    Patented May 8, 1837.
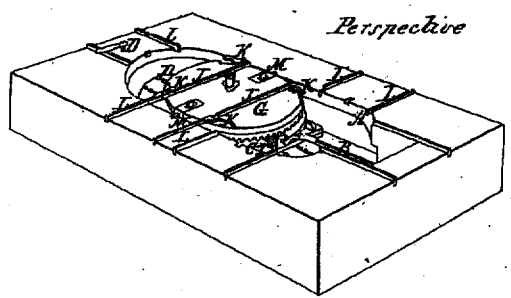
Perspective
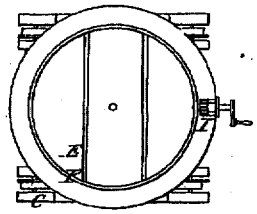
Top of Carriage.
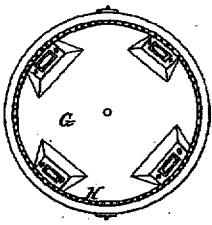
Bottom of Table.
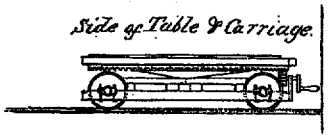
Side of Table & Carriage.
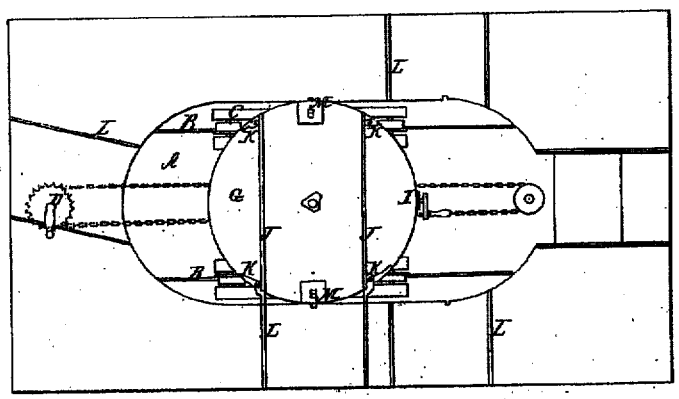
Top View.

UNITED STATES PATENT OFFICE.

JEREMIAH MYERS, OF ATTLEBORO, MASSACHUSETTS.

TURNABOUT FOR RAILROADS.

Specification of Letters Patent No. 189, dated May 8, 1837.

*To all whom it may concern:*

Be it known that I, JEREMIAH MYERS, of Attleboro, in the county of Bristol and State of Massachusetts, have invented a new and useful Improvement in Turning-Tables for Locomotive-Engines and Cars, called "Myers' Improved Turning-Table for Railroads," which is described as follows, reference being had to the annexed drawings of the same, making part of this specification.

This improvement consists in forming a pit of an oblong figure of any desirable length rounded at each end, having rails at the bottom extending from end to end, over which the carriage with the turning table and locomotive or car moves, in shifting them from one track to another, in any part of the workshop, depot, or carriage house, or other place, where the pit may be formed;—the carriage being moved by a windlass, pulleys, and chains, or other power, placed at each end of the pit, or attached to the carriage;—and in turning the table by means of a circular rack and pinion.

A represents the oblong pit with circular ends. B the rails at the bottom of the pit; C the carriage; D windlass, pulleys, and chain for moving the carriage backward or forward; E parrallel rails on the top of the carriage upon which the locomotive or car is run, when the turning table is not used; F circular rail upon which the wheels of the turning table move when this is used. G the turning table, or revolving circular platform; H circular rack on the under side of the turning table;—I pinion working into the circular racks for moving the turning table round with the locomotive or car thereon. J the rails on the top of the turning table. K movable rails turning on hinges for joining the ends of the rails of the several tracks with those of the turning table; L rails of the several tracks with which the rails of the turning table are made to coincide as required in shifting the locomotive engines or cars from one to another; M slides or locks for securing the turning table to the sides of the pit and keeping the rails parallel and in a line with each other.

The invention claimed by the subscriber and desired to be secured by Letters Patent consists in—

Placing the revolving circular platform or turning table upon a carriage moving on rails:—in making an oblong pit by which the locomotive engines or cars may be run off the turning table at right angles from any part of the pit, and from either end, obliquely as well as at right angles or otherwise, to any part of the work shop, depot, or carriage house, or other place:—and in the facility afforded from the above described form of the pit of clearing the turning table from snow ice or other substances: likewise in placing the locomotive engine or car upon a carriage running at right angles with the tracks, by which means the locomotive or car may be run off upon any other track parallel with the same.

A revolving circular platform or turning table is not claimed; but only the method of turning it by the use and application of a circular rack and pinion turned by a crank.

JEREMIAH MYERS.

Witnesses:
WM. P. ELLIOT.
WM. BISHOP.

*Disclaimer.*

*To Hon. Thomas Eubank, Commissioner of Patents:*

The petition of JEREMIAH MYERS, of Meredith village, in Belknap county, in the State of New Hampshire, formerly of Attleborough, in the county of Bristol and State of Massachusetts, respectfully represents that he did obtain Letters Patent of the United States for a new and useful Improvement in the Turnabout for Railroads or Turn-Tables, which Letters Patent are dated on the eighth day of May, in the year of our Lord one thousand eight hundred and thirty-seven; that he has reason to believe that, through inadvertence and mistake, the claim made in the specification of said Letters Patent is too broad, including that of which the said patentee was not the first inventor.

Your petitioner therefore hereby enters his disclaimer to that part of the claim in the aforenamed specification which is in the following words, to wit: "A revolving circular platform or turning table is not claimed but only the method of turning it by the use or application of a circular rack and pinion turned by a crank," which disclaimer is to operate to the extent of the whole interest in said Letters Patent, your petitioner being the sole proprietor thereof, and he having paid ten dollars into the Treasury of the United States agreeably to the requirements of the act of Congress in that case made and provided.

Boston, April 13th, 1850.

JEREMIAH MYERS.

Witness:
EVA LINCOLN.